United States Patent
Funo et al.

(10) Patent No.: US 7,667,594 B2
(45) Date of Patent: Feb. 23, 2010

(54) SENSOR THAT CAN BE IRREVERSIBLY CHANGED

(75) Inventors: Hiroyuki Funo, Ashigarakami-gun (JP); Masao Watanabe, Ashigarakami-gun (JP); Kiyoshi Iida, Ashigarakami-gun (JP); Ryota Mizutani, Ashigarakami-gun (JP); Yasuaki Konishi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 255 days.

(21) Appl. No.: 11/580,990

(22) Filed: Oct. 16, 2006

(65) Prior Publication Data

US 2008/0012580 A1 Jan. 17, 2008

(30) Foreign Application Priority Data

Jun. 13, 2006 (JP) .............................. 2006-163950

(51) Int. Cl.
*G08B 1/08* (2006.01)
(52) U.S. Cl. ......................... 340/539.26; 340/538.16; 340/562
(58) Field of Classification Search ............ 340/539.26, 340/539.22, 539.27, 538.16, 562; 327/111
See application file for complete search history.

(56) References Cited

U.S. PATENT DOCUMENTS

| 4,973,874 | A | * | 11/1990 | Carr, Jr. ........................ 310/306 |
| 5,159,486 | A | * | 10/1992 | Webb .......................... 359/299 |
| 5,492,016 | A | * | 2/1996 | Pinto et al. ..................... 73/724 |
| 5,519,328 | A | * | 5/1996 | Bennett ........................ 324/684 |
| 6,801,117 | B2 | * | 10/2004 | Morris et al. ................. 337/401 |
| 6,882,273 | B2 | * | 4/2005 | Kano ........................ 340/539.1 |
| 7,176,698 | B2 | * | 2/2007 | Birlingmair et al. ......... 324/648 |
| 7,219,024 | B2 | * | 5/2007 | Gamache et al. .............. 702/65 |

FOREIGN PATENT DOCUMENTS

| JP | A-6-331581 | 12/1994 |
| JP | 2002-033812 | * 12/2002 |
| JP | A 2003-232687 | 8/2003 |
| JP | A 2005-172839 | 6/2005 |
| JP | A 2006-047030 | 2/2006 |

* cited by examiner

*Primary Examiner*—Daniel Previl
(74) *Attorney, Agent, or Firm*—Oliff & Berridge, PLC

(57) ABSTRACT

A sensor of this comprises a receiving section that receives a signal that is sent from outside, a circuit whose impedance changes irreversibly in accordance with an environmental change, a measurement section that measures the impedance of the circuit in an event that a signal is received by the receiving section, and a sending section that sends data representing a measurement result of the measurement section.

9 Claims, 5 Drawing Sheets

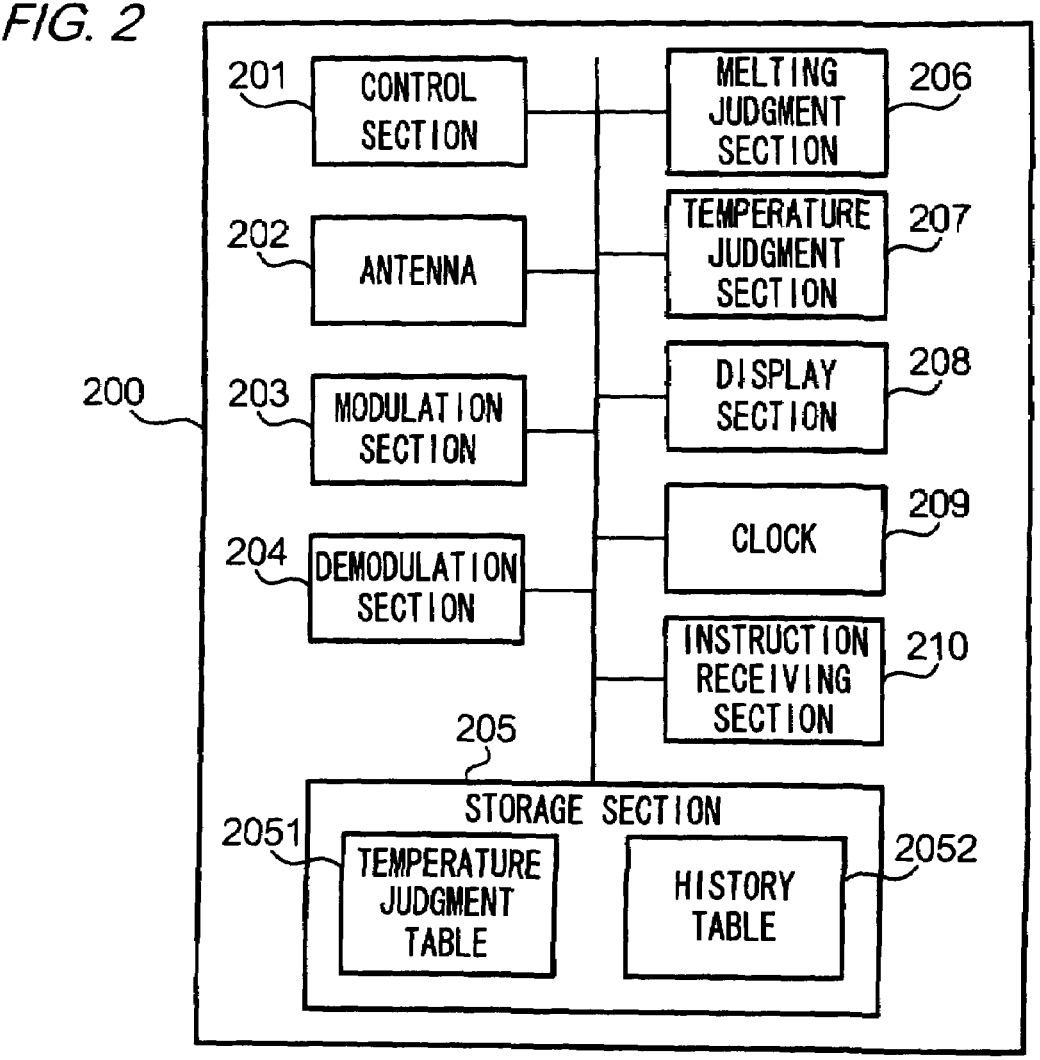

| ID | DATE/TIME | TEMPERATURE | RESULT OF MELTING JUDGMENT |
|---|---|---|---|
| 56ff24bc | 2006/01/5 12:25 | t21 | NO |
| | 2006/01/5 12:30 | t21 | NO |
| | 2006/01/5 12:35 | t30 | NO |
| | 2006/01/5 12:40 | t45 | NO |
| | 2006/01/5 12:45 | t60 | YES |
| | ⋮ | ⋮ | ⋮ |
| | 2006/01/5 18:00 | t80 | YES |
| ... | ... | ... | ... |

INITIAL STATE   DURING MOVEMENT   AFTER MOVEMENT

INITIAL STATE   AFTER WAX HAS MELTED

SENSOR THAT CAN BE IRREVERSIBLY CHANGED

BACKGROUND

1. Technical Field

The present invention relates to sensors.

2. Related Art

Sensors are known that acquire, from a distance, the temperature history of an environment in which goods are placed while those goods are being transported or stored. Such sensors are used to ascertain whether, for example, frozen food or the like has been kept in its frozen state until its arrival at a retail store or the consumer.

A technology has been proposed, in which this type of sensor is combined with an IC tag, and data representing the temperature history measured with the sensor is stored in the IC. However, with this system, the data representing the temperature history is stored as electronic data, so that there is the risk that the data is tampered with.

SUMMARY

According to an aspect of the invention, there is provided a sensor comprising a receiving section that receives a signal that is sent from outside, a circuit whose impedance changes irreversibly in accordance with an environmental change, a measurement section that measures the impedance of the circuit in an event that a signal is received by the receiving section, and a sending section that sends data representing a measurement result of the measurement section.

BRIEF DESCRIPTION OF THE DRAWINGS

Exemplary embodiment(s) of the present invention will be described in detail based on the following figures, wherein:

FIG. 2 is a diagram illustrating the configuration of a querying device 200;

FIG. 3 is a diagram showing an example of a temperature judging table 2051;

DETAILED DESCRIPTION

The following is an explanation of exemplary embodiments of the present invention, with reference to the accompanying drawings.

Configuration

Figure 1A:
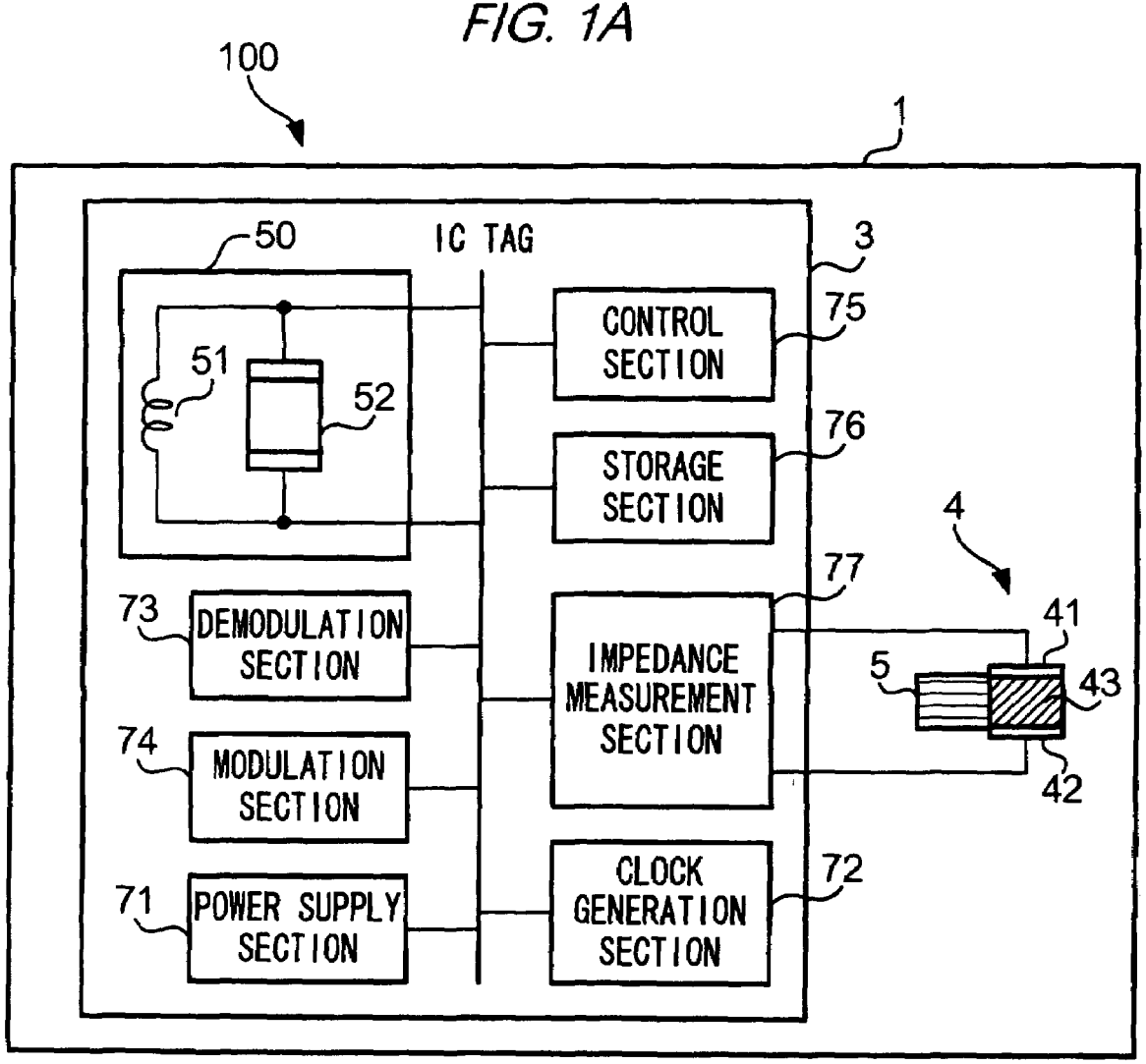
FIGS. 1A and 1B show diagrams illustrating the configuration of a sensor 100.

FIG. 1A is a diagram showing the configuration of a sensor 100. This sensor 100 is made of a substrate 1, an IC (Integrated Circuit) tag 3 disposed on the substrate 1, a capacitor 4 and an absorbing section 5.

Both electrodes of the capacitor 4 are connected to the IC tag 3. The capacitor 4 is made of plate-shaped electrodes 41 and 42 that are arranged facing each other, and a lump of wax 43 that is interposed between the electrodes 41 and 42. The lump of wax 43 acts as a dielectric.

Figure 1B:
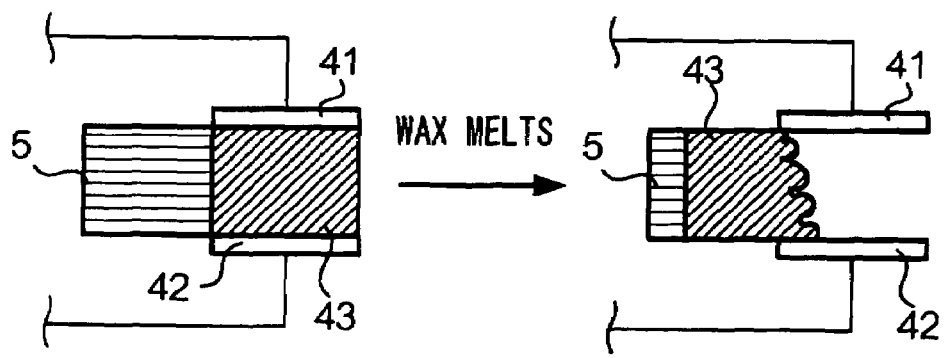

The absorbing section 5 is made of a material that absorbs liquid wax (such as paper), and is disposed adjacent to a location where the lump of wax 43 is not in contact with the electrodes 41 and 42. When the temperature of the lump of wax 43 reaches the melting point of the wax, the lump of wax 43 melts and becomes liquid. The melted wax does not maintain the shape it had before melting, so that the wax flows out from between the electrodes 41 and 42, as shown in FIG. 1B. The absorbing section 5 absorbs the liquid wax that has flown out. Accordingly, the space between the electrodes 41 and 42 that was taken up by the lump of wax 43 is filled with air. The dielectric constant of air is smaller than the dielectric constant of wax, so that the static capacitance of the capacitor 4 decreases, and as a result, the impedance of the capacitor 4 increases.

This increase of impedance is an irreversible change. This is because if the temperature drops below the melting point of the wax after the melted wax has been absorbed by the absorbing section 5, the wax solidifies in a state in which it is held inside the absorbing section 5 and will not return to its original position. Thus, in the present application, "irreversible change" does not mean that the change of the state is under no circumstances irreversible, but rather that a change that has occurred due to an environmental change will not return to the original state or shape regardless of a shift in this environmental change, or will not return to the original state or shape unless an external force other than that due to the environmental change is applied.

Furthermore, there is a certain range within which the amount of the impedance increases. That is to say, the longer the time for which the temperature has reached or exceeded the melting point of the wax, the greater the amount of wax that flows out. And the greater the amount of wax that flows out, the greater the proportion of space that is taken up by air between the electrodes 41 and 42, and thus the greater the impedance. If the entire wax flows out, the impedance becomes greatest. Consequently, if the relation between the impedance of the capacitor 4 and the temperature is experimentally determined beforehand, then it is possible to judge, by measuring the impedance of the capacitor 4, whether the lump of wax 43 has melted.

The following is a description of the configuration of the IC tag 3.

The antenna 50 is made of a coil 51 and a capacitor 52 that is connected in parallel to the coil 51. That is to say, the antenna 50 is configured as a resonance circuit. The capacitor 52 is made of a pair of electrodes and a dielectric interposed between the electrodes. The dielectric is for example a perovskite compound, and has the property that its dielectric constant changes depending on temperature. When the dielectric constant changes, the capacitance of the capacitor 52 changes. Since the antenna 50 is configured as a resonance circuit, when the capacitance of the capacitor 52 changes, also the resonance frequency changes. That is to say, the resonance circuit has the property that its resonance frequency changes depending on temperature. Consequently, if the relation between the resonance frequency of the resonance circuit and the temperature is experimentally determined beforehand, then it is possible to determine the temperature by measuring the resonance frequency of the antenna 50.

A power supply section 71 retrieves electric power that is induced into the coil 51 when the antenna 50 receives electromagnetic waves, and supplies this electric power to the various sections of the IC tag 3.

A clock generation section 72 generates a clock signal based on a carrier wave included in the received electromagnetic waves and supplies it to a control section 75.

A demodulation section 73 retrieves the data by demodulating the signal received with the antenna 50.

A modulation section 74 modulates signals based on the data representing the impedance of the capacitor 4.

The control section 75 receives the data from the demodulation section 73 and if the data represents a command, it performs processing according to that command. Examples of commands are a write command instructing that the received data is written into a storage section 76, and a read command instructing that the data written into the storage section 76 is read out and sent.

The storage section 76 is a non-volatile memory, from which data is not deleted even when there is no power supplied from the power supply section 71. The storage section 76 stores an ID (identification code or identifier) for unambiguously identifying the IC tag 3. Moreover, if data representing a judgment result by a melting judgment section 206 or a temperature judgment section 207 of a later-explained querying device 200 is sent from the querying device 200, then the storage section 76 stores that data.

Both electrodes of the capacitor 4 are connected to an impedance measurement section 77. The impedance measurement section 77 measures the impedance of the capacitor 4 using electric power supplied from the power supply section 71.

FIG. 2 is a diagram showing the configuration of the querying device 200.

A control section 201 reads out a program for controlling the various sections of the querying device 200 from a storage section 205.

An antenna 202 sends and receives radio signals to/from the sensor 100.

A modulation section 203 generates signals for judging whether the wax has melted as well as for measuring the temperature and supplies these signals to the antenna 202.

A demodulation section 204 demodulates radio signals received with the antenna 202 and retrieves data. The retrieved data is data representing the impedance of the capacitor 4.

The storage section 205 stores a threshold value of the impedance of the capacitor 4. As noted above, in the event that the lump of wax 43 has melted, the impedance of the capacitor 4 increases and takes on a value within a certain range. This range is determined for example experimentally and the lower limit of the determined range is taken as the threshold value.

The storage section 205 also stores a temperature judgment table 2051. FIG. 3 is a diagram showing an example of the temperature judgment table 2051. The temperature judgment table 2051 lists the relation between the resonance frequency of the antenna 50 and the temperature.

Figures 4, 5:
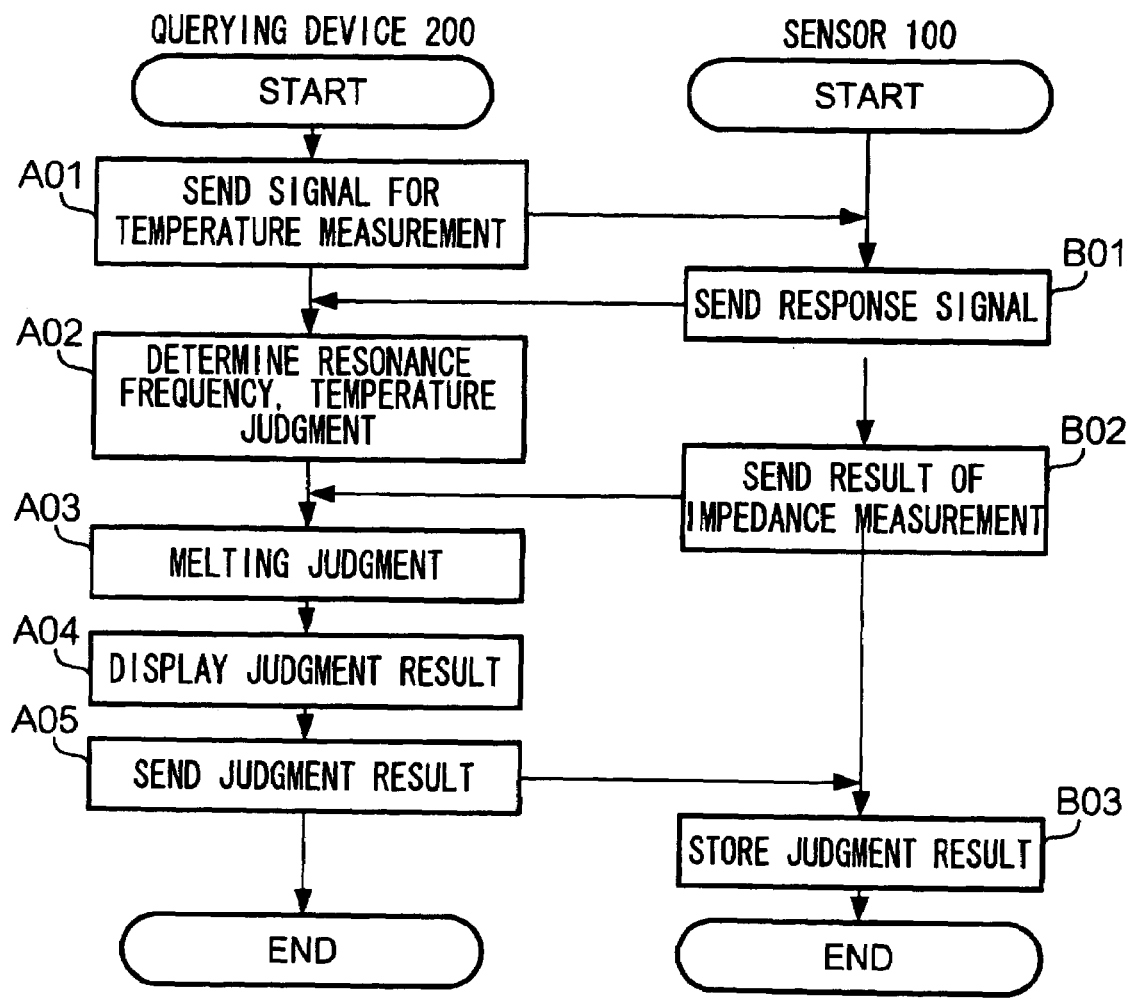
FIG. 4 is a diagram showing an example of a history table 2052.
FIG. 5 is a diagram illustrating the operation flow of the sensor 100 and the querying device 200.

The storage section 205 also stores a history table 2052. FIG. 4 is a diagram showing an example of the history table 2052. In the history table 2052, the date and time at which a temperature judgment and a melting judgment were carried out and the results of these judgments are stored in association with each other.

If the impedance of the capacitor 4 has reached the threshold, the melting judgment section 206 judges that the lump of wax 43 has melted.

The temperature judgment section 207 judges the temperature based on the strength of the signal received from the sensor 100 and the content of the temperature judgment table 2051.

The display section 208 is for example a liquid display panel and displays an image representing the judgment results of the melting judgment section 206 and the temperature judgment section 207.

A clock 209 keeps track of the time and date.

An instruction receiving section 210 is for example a push button-type switch and sends a predetermined signal to the control section 201 in the event that the user has pushed this switch. When the control section 201 has received this signal, it lets the various sections of the querying device 200 perform the above-described processing.

The following is a description of the operation of the sensor 100 and the querying device 200.

FIG. 5 is a diagram illustrating the operation flow of the sensor 100 and the querying device 200.

First, when at Step A01 the instruction receiving section 210 is pushed down, the antenna 202 sends a signal for temperature measurement to the sensor 100. More specifically, the modulation section 203 modulates a signal by gradually increasing its frequency from the lower limit to the upper limit within the range stored in the temperature judgment table 2051 and sends this signal via the antenna 202 to the sensor 100.

In Step B01, the sensor 100 receives this signal with the antenna 50 and sends a response signal in response to this signal via the antenna 50 to the querying device 200.

At Step A02, the temperature judgment section 207 of the querying device 200 determines the resonance frequency of the antenna 50 by measuring the strength of the received response signal. More specifically, the strength of the response signal drops sharply from a constant value prior to the resonance frequency of the antenna 50 and becomes lowest at the resonance frequency. Then, it increases sharply when the resonance frequency is exceeded and returns to the constant value. Consequently, by determining the frequency where the strength of the response signal has the lowest value, it is possible to determine the resonance frequency of the antenna 50. Moreover, the temperature judgment section 207 determines the temperature corresponding to the determined resonance frequency from the temperature judgment table 2051.

At Step B02, the impedance measurement section 77 of the sensor 100 measures the impedance of the capacitor 4. Then, the modulation section 74 supplies to the antenna 50 a signal representing the measurement result as well as the ID of the IC tag 3, and the antenna 50 sends this signal to the querying device 200.

At Step A03, the melting judgment section 206 judges from this signal whether the lump of wax 43 has melted. More specifically, the antenna 202 receives the signal from the sensor 100, the demodulation section 204 demodulates this signal, and the data representing the impedance of the capacitor 4 is retrieved. If the impedance represented by this data has reached the threshold, the melting judgment section 206 judges that the lump of wax 43 has melted. As explained above, in the event that the lump of wax 43 has melted, the impedance change of the capacitor 4 is irreversible. Since the melting judgment section 206 performs the melting judgment based on this impedance change, there is no risk that the data used for the melting judgment is tampered with.

At Step A04, the display section 208 displays an image representing the temperature determined with the temperature judgment section 207 and the judgment result of the melting judgment section 206. Moreover, this data is associated with the ID of the IC tag 3 and written into the history table 2052.

At Step A05, the temperature determined with the temperature judgment section 207, the judgment result of the melting judgment section 206, the current time obtained with the clock 209, and data representing a write command are supplied to the modulation section 203. The modulation section 203 modulates a signal based on this data, and sends the signal via the antenna 202 to the sensor 100.

At Step B03, the antenna 50 receives the signal sent from the querying device 200, the demodulation section 73 demodulates the signal, and the obtained data is supplied to the control section 75. If the data contains a write command, the control section 75 stores the temperature and the result of the melting judgment in the storage section 76, similar to the history table 2052 of the querying device 200.

MODIFIED EXAMPLES

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, embodiments in which the above-described exemplary embodiment is modified as explained below are also possible.

Modified Example 1

Figure 6A:
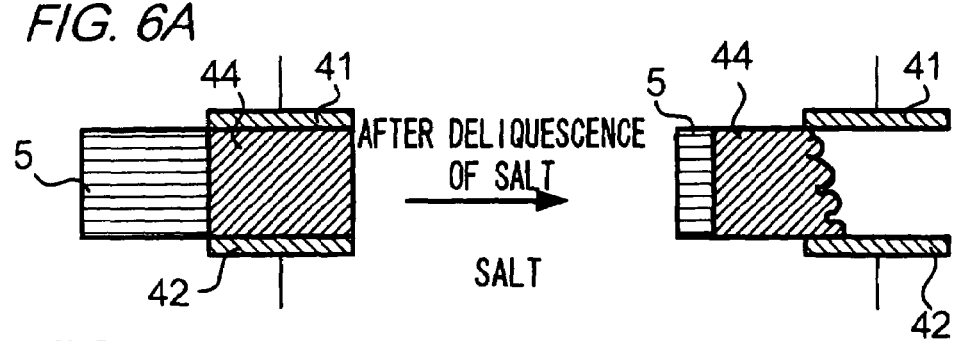
FIGS. 6A, 6B, 6C, 6D and 6E show diagrams illustrating modified examples.

FIG. 6A is a diagram showing a modified example. In this modified example, a lump of salt 44 is used as the dielectric of the capacitor 4. The lump of salt 44 can be, for example, calcium chloride. The lump of salt 44 is arranged between the electrodes 41 and 42 and the exposed surface of the lump of salt 44 is covered by a moisture-permeable film, through which for example water molecules in the air can pass through. Thus, in the event that the humidity around the sensor 100 reaches a predetermined humidity, the lump of salt 44 deliquesces and flows out from between the electrodes 41 and 42. Accordingly, the impedance of the capacitor 4 changes as in the above-described exemplary embodiment, and does not return to its original value. Thus, it can be judged from the impedance of the capacitor 4 whether the humidity around the sensor 100 has reached a predetermined value.

Figure 6B:
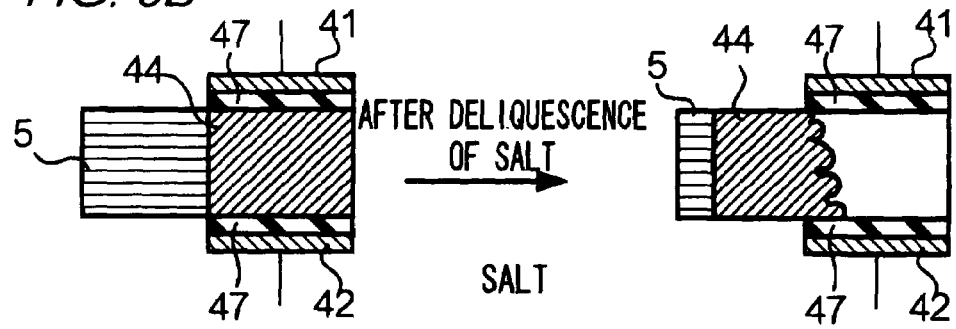

As shown in FIG. 6B, it is also possible to place an insulator 47 between the lump of salt 44 and the electrodes 41 and 42. In this case, the lump of salt 44 insulated by the insulator 47 functions in its entirety as the dielectric of the capacitor 4. When the lump of salt 44 is insulated from the electrodes 41 and 42, impedance of the capacitor 4 always takes a positive value even though the lump of salt 44 deliquesces and becomes a conductor at measurement timings, and it is possible to judge whether there were any critical changes of impedance of the capacitor 4 between the measurement timings on the basis of the measured values.

Modified Example 2

Figure 6C:
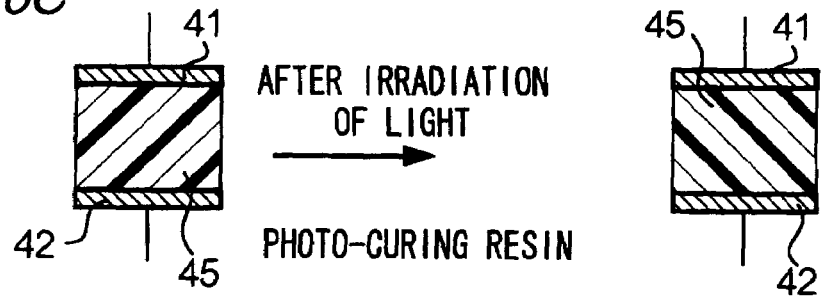

FIG. 6C is a diagram showing a modified example. In this modified example, a photo-curing resin 45, which cures in the event that it is exposed to light of a predetermined wavelength, for example ultraviolet light or the like, is used as the dielectric of the capacitor 4. This photo-curing resin 45 is arranged between the electrodes 41 and 42 and the exposed surface of the photo-curing resin 45 is covered by a transparent resin, for example. Thus, in the event that the sensor 100 is exposed to light, the photo-curing resin 45 is cured. Accordingly, the impedance of the capacitor 4 changes as in the above-described exemplary embodiment, and does not return to its original value. Thus, it can be judged from the impedance of the capacitor 4 whether the sensor 100 has been exposed to light of a predetermined wavelength.

Modified Example 3

Figure 6D:
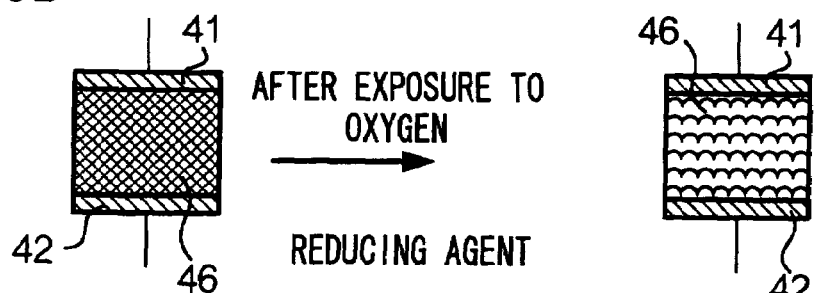

FIG. 6D is a diagram showing a modified example. In this modified example, a reducing agent 46 such as metallic sodium is used as the dielectric of the capacitor 4. Thus, in the event that the sensor 100 is placed in an oxygen atmosphere, the reducing agent 46 is oxidized. Accordingly, the impedance of the capacitor 4 changes as in the above-described exemplary embodiment, and does not return to its original value. Thus, it can be judged from the impedance of the capacitor 4 whether the sensor 100 has been placed in an oxygen atmosphere.

Figure 6E:
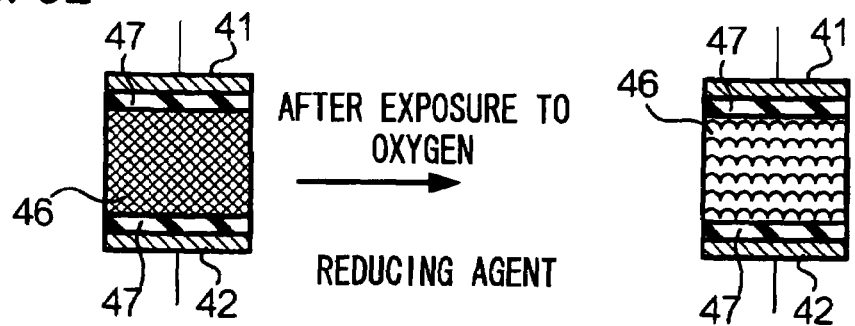

As shown in FIG. 6E, it is also possible to place an insulator 47 between the reducing agent 46 and the electrodes 41 and 42. In this case, the reducing agent 46 insulated by the insulator 47 functions in its entirety as the dielectric of the capacitor 4. When the reducing agent 46 is insulated from the electrodes 41 and 42, impedance of the capacitor 4 always takes a positive value even though the reducing agent 46 is oxidized and becomes a conductor at measurement timings, and it is possible to judge whether there were any critical changes of impedance of the capacitor 4 between the measurement timings on the basis of the measured values.

Modified Example 4

Figure 7A:
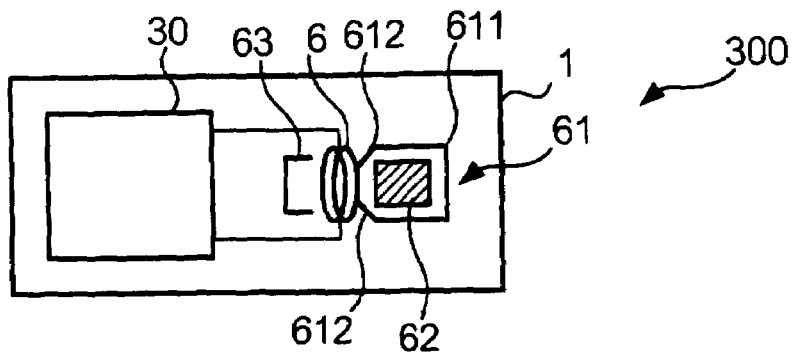
FIGS. 7A and 7B show diagrams illustrating a sensor 300.

FIG. 7A is a plan view showing a sensor 300. In this modified example, a coil 6 is provided instead of the capacitor 4, and both electrodes of the coil 6 are connected to an IC tag 3. A holding section 61 is disposed next to the coil 6. The holding section 61 is made of a frame 611 and latches 612. The frame 611 is shaped like the Japanese character コ (that is, like a rectangle missing its left side) when viewed in the top view and the latches 612 are provided at both ends of the character コ. A ferromagnetic member 62, for example made of iron, is formed to a size that is slightly smaller than the space inside the holding portion 61 viewed from above. The distance between the tips of the two latches 612 is smaller than the vertical width of the ferromagnetic member 62 in the drawing. Therefore, in a state in which no external force such as inertia acts on the ferromagnetic member 62, the ferromagnetic member 62 is held inside the holding section 61 and will not escape out of the holding section 61.

Figure 7B:
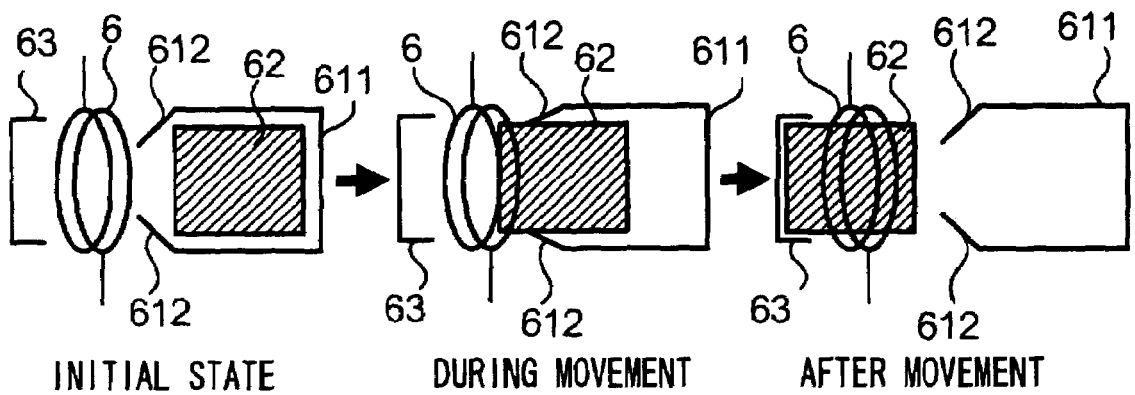

FIG. 7B is a drawing illustrating the movement of the ferromagnetic member 62. In the event that an external force, such as inertia, acts on the ferromagnetic member 62 in the direction to the left in the figure and the size of this external force exceeds a predetermined value, the latches 612 are pushed apart by the ferromagnetic member 62, the ferromagnetic member 62 is ejected out of the holding section 61 and enters the space inside the coil 6. At a position on the other side of the coil 6 with respect to the holding section 61, a stopper 63 stopping the movement of the ferromagnetic member 62 is provided. When the ferromagnetic member 62 is ejected completely out of the holding section, the latches 612 return to their original shape due to their elasticity. Accordingly, the distance between the tips of the two latches 612 is smaller than the vertical width of the ferromagnetic member 62, so that even when an external force to the right in the figure acts on the ferromagnetic member 62, the ferromagnetic member 62 will not enter the holding section 61. That is to say, in the event that the ferromagnetic member 62 is completely ejected from the holding section 61, the movement of the ferromagnetic member 62 is irreversible.

Accordingly, in the event that the ferromagnetic member 62 is ejected from the holding section 61 and enters into the coil 6, the impedance of the coil 6 changes and does not return to its original value. Thus, it can be judged from the impedance of the coil 6 whether an external force of a predetermined size has acted on the sensor 100.

Modified Example 5

Figure 8A:
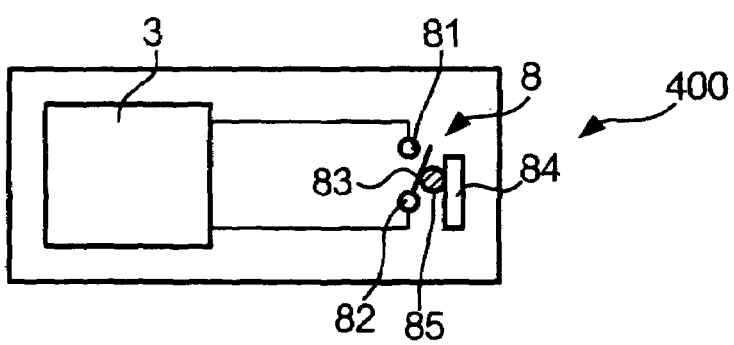
FIGS. 8A and 8B show diagrams illustrating a sensor 400.

FIG. 8A is a plan view showing a sensor 400. In this modified example, a switch 8 is provided instead of the capacitor 4, and two contacts 81 and 82 of the switch 8 are connected to the IC tag 3. A support section 84 is arranged next to a movable section 83 of the switch 8. The supporting section 84 is for example a plate-shaped member. The movable section 83 and the supporting section 84 are joined together for example by a lump of wax 85 in a state in which the switch is open. In this state, the movable section 83 is elastically deformed, and the lump of wax 85 is held in a state in which the switch 8 is opened, countering the elastic force of the movable section 83. The IC tag 3 has the function of testing conductivity of the circuit and can judge whether the switch 8 is open or not.

Figure 8B:
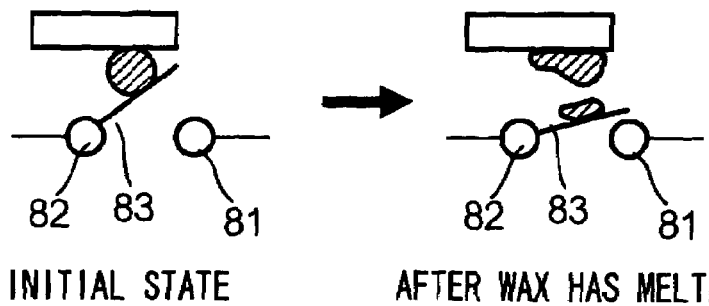

FIG. 8B is a diagram illustrating the open and closed states of the switch 8. In the event that the temperature around the sensor 100 reaches the melting point of the wax, the lump of wax 85 melts, the movable section 83 is returned to its original shape due to its elasticity, and the switch 8 is closed. When the lump of wax 85 melts, the switch 8 does not return to its open state. Thus, by testing whether a current flows through the circuit, it can be judged whether the temperature around the sensor 100 has reached the melting point of the wax.

Moreover, if a lump of salt having deliquescence is used instead of the lump of wax 85, then by testing whether a current flows through the circuit, it can be judged whether the humidity around the sensor 100 has reached a predetermined value.

What is claimed is:

1. A sensor comprising:
   a receiving section that receives a signal that is sent from outside,
   a circuit having an element that changes impedance of the circuit, the element configured to change the impedance from a first value to a second value upon occurrence of an environmental change, and the element further configured to prohibit the impedance to reach the first value when no external force which is different to the environmental change is imposed;
   a measurement section that measures the impedance of the circuit in an event that a signal is received by the receiving section, and
   a sending section that sends data representing a measurement result of the measurement section.

2. The sensor according to claim 1, wherein the circuit comprises a capacitor comprising a dielectric that melts when a predetermined temperature is reached.

3. The sensor according to claim 1, wherein the circuit comprises a capacitor comprising a dielectric that deliquesces when a predetermined humidity is reached.

4. The sensor according to claim 1, wherein the circuit comprises a capacitor comprising a dielectric that is cured when exposed to light.

5. The sensor according to claim 1, wherein the circuit comprises a capacitor comprising a dielectric that chemically reacts with a predetermined substance.

6. The sensor according to claim 1, wherein the circuit comprises
   a coil,
   a ferromagnetic member, and
   a holding section that holds the ferromagnetic member outside of the coil and that causes the ferromagnetic member to enter into the coil by releasing the ferromagnetic member in the event that an external force exceeding a predetermined size acts on the ferromagnetic member.

7. The sensor of claim 1, the element comprising a capacitor having a dielectric that permanently changes in response to the environmental change.

8. The sensor of claim 1, the element comprising a capacitor,
   wherein the change in impedance of the element due to the environmental change can be visually confirmed by viewing the capacitor.

9. The sensor of claim 1, the element comprising a capacitor having a constant capacitative gap.

* * * * *